US005336970A

United States Patent [19]

Einbinder

[11] Patent Number: 5,336,970

[45] Date of Patent: Aug. 9, 1994

[54] GAS TUBE PROTECTOR

[75] Inventor: Itamar B. Einbinder, Overland Park, Kans.

[73] Assignee: AT&T Bell Laboratories, Murray Hill, N.J.

[21] Appl. No.: 153,832

[22] Filed: Nov. 17, 1993

Related U.S. Application Data

[63] Continuation of Ser. No. 813,553, Dec. 26, 1991, abandoned.

[51] Int. Cl.[5] ........................ H01J 61/06; H02H 9/06

[52] U.S. Cl. .................................... 313/631; 313/581; 313/602; 313/603; 313/632; 313/231.11; 313/231.41; 313/306; 313/355; 313/346 R; 361/119; 361/120

[58] Field of Search ............... 313/631, 581, 592, 602, 313/603, 632, 634, 231.11, 231.41, 306, 308, 325, 345, 355, 346 R; 361/119, 120, 126; 501/11, 53, 66, 77, 134, 137

[56] References Cited

U.S. PATENT DOCUMENTS

| | | | |
|---|---|---|---|
| 4,360,757 | 11/1982 | Hahndorf | 313/346 R X |
| 4,393,433 | 7/1983 | Anderson et al. | 313/325 X |
| 4,407,849 | 10/1983 | Haas et al. | 361/120 X |
| 4,558,390 | 12/1985 | Fortino et al. | 361/119 |
| 4,644,441 | 2/1987 | Igarashi | 361/120 |

FOREIGN PATENT DOCUMENTS

| | | | |
|---|---|---|---|
| 2085222 | 4/1982 | United Kingdom | 361/120 |
| 2122807 | 1/1984 | United Kingdom | 361/120 |

*Primary Examiner*—Donald J. Yusko
*Assistant Examiner*—Ashok Patel
*Attorney, Agent, or Firm*—Lester H. Birnbaum

[57] ABSTRACT

A gas tube protector includes a new coating for the electrodes. The coating, which eliminates the need for conditioning the electrodes prior to using or testing the protector, includes barium titanate and titanium.

7 Claims, 1 Drawing Sheet

GAS TUBE PROTECTOR

This application is a continuation of application Ser. No. 07/813,533, filed on Dec. 26, 1991 now abandoned.

BACKGROUND OF THE INVENTION

This invention relates to gas tube protectors.

Gas tube protectors, also known as gas surge limiters, are used extensively in the telecommunications network in order to protect customer premises equipment from excess voltages which result from such causes as lightning strikes. The devices are connected in parallel with the protected equipment and include at least two electrodes, one coupled to a customer line and the other coupled to a ground potential. Between the electrodes is a spark gap which is normally nonconducting so that the protector does not interfere with the usual operation of the customer's equipment. However, if a sufficiently high voltage appears on the line, the device will fire and shunt the excess voltage to ground.

A coating of glass thermionic material is usually provided on the surface of the electrodes to enhance the discharge of the device. One problem with the use of such coatings is that the electrodes would have to be "conditioned" prior to use. That is, a specific firing sequence would be employed in order to produce the right coating composition and to form points of initiation for arcing across the electrode gap. This firing sequence would typically involve applying a 1000 VRMS signal through a 100 ohm limiting resistor for approximately one second with a 0.022 microfarad capacitor in parallel with the gap. This conditioning requires special equipment and also tends to adversely affect the breakdown ranges of the device.

It is, therefore, an object of the invention to produce a gas tube protector which does not require conditioning.

SUMMARY OF THE INVENTION

This and other objects are achieved in accordance with the invention which is a gas tube protector comprising a pair of electrodes with a spark gap therebetween. A coating is formed on a surface of at least one electrode adjacent to the gap. The coating comprises barium titanate and titanium.

BRIEF DESCRIPTION OF THE DRAWING

These and other features the invention are delineated in detail in the following description. In the drawing:

The Figure is a cross-sectional view of a gas tube protector including electrode coatings in accordance with an embodiment of the invention.

Figure 1:
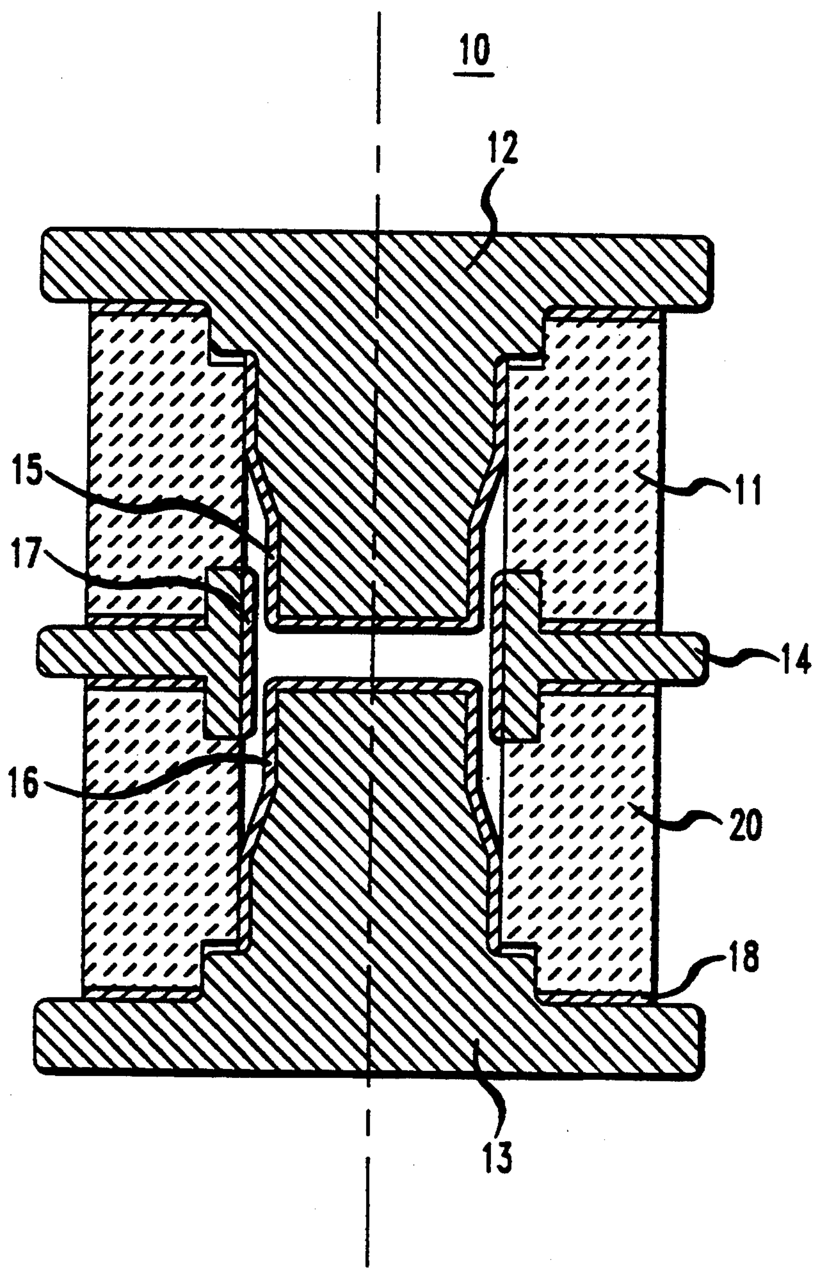

It will be appreciated that, for purposes of illustration, this Figure is not necessarily drawn to scale.

DETAILED DESCRIPTION

The Figure is a cross-sectional view of a typical gas tube protector, 10, including the invention. Two electrodes, 12 and 13, are mounted to opposite ends of a pair of cylindrical insulating housings 11 and 20. The electrodes are typically copper and the housing is typically ceramic. The electrodes are mounted by means of layers of solder, e.g., 18, formed between the ends of the housings and flanged portions of the electrodes.

A third electrode 14 is also soldered to the insulating housings. This electrode is essentially cylindrical with a flanged portion which is soldered between adjacent edges of the insulating housings 11 and 20 as shown. The electrode 14 thereby forms spark gaps with both electrodes 12 and 13.

The gas tube is typically sealed with an inert gas such as argon occupying the spaces between the electrodes. Thus, with electrode 14 coupled to ground potential and electrodes 12 and 13 coupled to the ring and tip conductors, respectively, of a standard telecommunications network, the device is normally nonconducting. When a sufficient voltage appears at either electrode 12 or 13, the gas will be sufficiently ionized to produce a discharge between electrode 12 and 13 and ground electrode 14 in order to shunt the voltage from the protected equipment.

In order to aid in this discharge, electrodes 12, 13 and 14, each include a coating, 15, 16, and 17, respectively, of a glass thermionic material. In a typical device, the coating would include a mixture of $Na_2O$, BaO, $B_2O_3$, $Al_2O_3$ and $SiO_2$, and the thickness of the coating would be in the range 9,000 Å–12,000 Å.

In accordance with a main feature of the invention, a new coating is formed on the electrodes such that conditioning is not required. In particular, it was discovered that the addition of barium titanate ($BaTiO_3$) and titanium (Ti) to a standard glass coating would produce a device ready for testing or firing without the necessity of the conditioning step. In a particular example, 25 weight percent of titanium in the form of a 325 mesh powder and 25 weight percent barium titanate were added to a glass thermionic composition including 35 mole percent $Na_2O$, 2 mole percent BaO, 27.42 mole percent $B_2O_3$, 19.58 mole percent $Al_2O_3$ and 16 mole percent $SiO_2$. The new composition was spray coated onto the surfaces of all three electrodes by standard techniques to a thickness of approximately 10,000 Å.

With this coating, the DC breakdown voltage of the devices was typically within the range 300–400 DC volts for either positive or negative plurality, without any prior conditioning. This indicated that the devices were ready for use without the necessity of prior conditioning. Other important parameters were an impulse breakdown voltage typically less than 500 volts, for positive or negative polarity, an insulation resistance typically much greater than 100 megohms, maintaining balanced device characteristics, and passing service life testing at 10 amps DC, 300 amps DC, and 20 amps AC.

In accordance with another embodiment, the thermionic composition consisted of 72 weight percent $SiO_2$, 0.75 weight percent $Al_2O_3$, 15 weight percent $Na_2O$, 25 weight percent $K_2O$, 10 weight percent BaO and 2 weight percent Mn0. The amount of barium titanate added was 25 weight percent and the amount of titanium added was 25 weight percent.

While specific compositions for the coating were described, it will be appreciated that the composition will vary. In general, it is expected that the weight percent of barium titanate will vary from 10–25, and the weight percent of titanium will vary between 10–25. The combined weight percent of $BaTiO_3$ and Ti should be in the range 20–50. The remainder of the composition need not include all of the elements previously recited, but can be any glass thermionic composition. However, the compositions specified provide good performance at a low cost and can be made sprayable by mixing with equal parts of deionized water and methyl alcohol. Thus, those specific compositions are presently preferred.

While a three-electrode, dual gap, balanced protector device is illustrated in the Figure, it will be appreciated that the invention is equally applicable to two-electrode, single gap gas tube protectors.

Various additional modifications will become apparent to those skilled in the art. All such variations which basically rely on the teachings through which the invention has advanced the art are properly considered within the scope of the invention.

I claim:

1. A gas tube protector comprising:

an insulating housing;

a pair of electrodes mounted within the housing so as to form a spark gap therebetween; and a coating formed on a surface of at least one electrode adjacent to the gap, said coating comprising both barium titanate and titanium in its final form and a glass thermionic composition.

2. A device according to claim 1 wherein the glass thermionic composition comprises a mixture of $Na_2O$, BaO, $B_2O_3$, $Al_2O_3$ and $SiO_2$.

3. A device according to claim 1 wherein the weight percent of the barium titanate is within the range 10–25, and the weight percent of the titanium is within the range 10–25, while the combined weight percent of barium titanate and titanium is within the range 20–50.

4. A device according to claim 1 wherein the thickness of the coating is within the range 9,000 Å–12,000 Å.

5. A device according to claim 1 wherein the coating consists essentially of barium titanate, titanium, $Na_2O$, BaO, $B_2O_3$, $Al_2O_3$ and $SiO_2$.

6. A device according to claim 1 further comprising a third electrode mounted within the housing and forming a second spark gap with one of the two electrodes.

7. A device according to claim 1 wherein the DC breakdown voltage is within the range 300–400 volts.

* * * * *